US 8,146,703 B2
Apr. 3, 2012

(12) United States Patent
Baumann et al.

(54) METHOD FOR A SAFETY SYSTEM IN A VEHICLE

(75) Inventors: Karl-Heinz Baumann, Bondorf (DE); Michael Fehring, Neuhausen (DE); Rainer Justen, Altdorf (DE); Rodolfo Schoeneburg, Hechingen (DE)

(73) Assignee: Daimler AG, Stuttgart (DE)

( * ) Notice: Subject to any disclaimer, the term of this patent is extended or adjusted under 35 U.S.C. 154(b) by 868 days.

(21) Appl. No.: 11/791,708

(22) PCT Filed: Nov. 25, 2005

(86) PCT No.: PCT/EP2005/012613
§ 371 (c)(1),
(2), (4) Date: Sep. 10, 2008

(87) PCT Pub. No.: WO2006/058662
PCT Pub. Date: Jun. 8, 2006

(65) Prior Publication Data
US 2009/0210114 A1 Aug. 20, 2009

(30) Foreign Application Priority Data
Nov. 29, 2004 (DE) .................. 10 2004 057 604

(51) Int. Cl.
*B60T 7/12* (2006.01)

(52) U.S. Cl. ..................................... 180/275
(58) Field of Classification Search .............. 180/275
See application file for complete search history.

(56) References Cited

U.S. PATENT DOCUMENTS

| | | | | |
|---|---|---|---|---|
| 5,314,037 A * | 5/1994 | Shaw et al. | | 180/169 |
| 5,467,283 A * | 11/1995 | Butsuen et al. | | 701/301 |
| 5,529,138 A * | 6/1996 | Shaw et al. | | 180/169 |
| 5,530,651 A * | 6/1996 | Uemura et al. | | 701/301 |
| 5,585,798 A * | 12/1996 | Yoshioka et al. | | 342/70 |
| 6,084,508 A | 7/2000 | Mai et al. | | |
| 6,141,616 A * | 10/2000 | Auffhammer et al. | | 701/70 |
| 6,567,748 B2 * | 5/2003 | Matsuno | | 701/301 |
| 6,574,559 B2 * | 6/2003 | Shinmura et al. | | 701/301 |
| 6,721,659 B2 * | 4/2004 | Stopczynski | | 701/301 |
| 6,758,495 B2 | 7/2004 | Brambilla et al. | | |
| 6,856,906 B2 | 2/2005 | Winner et al. | | |
| 6,971,727 B2 * | 12/2005 | Yoshizawa et al. | | 303/193 |
| 7,015,805 B2 | 3/2006 | Knoop et al. | | |

(Continued)

FOREIGN PATENT DOCUMENTS

DE 36 37 165 A1 5/1988

(Continued)

OTHER PUBLICATIONS

International Search Report w/English translation of pertinent portion dated Mar. 3, 2006 (Twelve (12) pages).

(Continued)

*Primary Examiner* — Paul N Dickson
*Assistant Examiner* — Nicole Verley
(74) *Attorney, Agent, or Firm* — Crowell & Moring LLP

(57) ABSTRACT

A method for a safety system in a vehicle continuously evaluates data relating to the surroundings from a surroundings sensor system in terms of an imminent collision with an obstacle, and autonomous emergency braking is initiated in the event of an unavoidable collision. The emergency braking is maintained until a predefined event occurs. The predefined event can be the expiration of a time calculated in advance up to the collision or the impact which is actually detected by a sensor.

15 Claims, 2 Drawing Sheets

U.S. PATENT DOCUMENTS

| | | | |
|---|---|---|---|
| 7,034,742 B2 * | 4/2006 | Cong et al. | 342/70 |
| 7,035,735 B2 | 4/2006 | Knoop et al. | |
| 7,113,076 B2 * | 9/2006 | Yamamura | 340/425.5 |
| 7,178,622 B2 | 2/2007 | Eberle et al. | |
| 7,358,864 B2 * | 4/2008 | Mori et al. | 340/932.2 |
| 7,425,043 B2 * | 9/2008 | Doerr et al. | 303/193 |
| 2002/0011373 A1 * | 1/2002 | Wielenga | 180/275 |
| 2004/0019426 A1 | 1/2004 | Knoop et al. | |
| 2004/0112665 A1 * | 6/2004 | Wielenga | 180/275 |
| 2004/0155811 A1 | 8/2004 | Albero et al. | |
| 2009/0038873 A1 * | 2/2009 | Lucas et al. | 180/275 |

FOREIGN PATENT DOCUMENTS

| | | |
|---|---|---|
| DE | 197 38 611 A1 | 1/1999 |
| DE | 197 36 840 A1 | 2/1999 |
| DE | 100 05 010 A1 | 8/2001 |
| DE | 101 21 386 C1 | 8/2002 |
| DE | 102 31 555 A1 | 1/2003 |
| DE | 102 31 558 A1 | 1/2003 |
| DE | 102 31 557 A1 | 7/2003 |
| FR | 2 769 884 A1 | 4/1999 |
| JP | 2004-330997 A | 11/2004 |
| WO | WO 03/006289 A1 | 1/2003 |
| WO | WO 2004/028847 A1 | 4/2004 |

OTHER PUBLICATIONS

German Search Report dated May 19, 2005 with English translation of relevant portion (Eight (8) pages).

* cited by examiner

METHOD FOR A SAFETY SYSTEM IN A VEHICLE

RELATED APPLICATIONS

This application is a national phase entry under 35 U.S.C. §371, of International application PCT/EP2005/012613, filed Nov. 25, 2005, which is based on German patent application serial number 10 2004 057 604.1, which was filed Nov. 29, 2004. The contents of each of these disclosures are expressly incorporated by reference herein.

BACKGROUND AND SUMMARY OF THE INVENTION

The present invention relates to methods for a safety system in a vehicle, in which data relating to the surroundings from a surroundings sensor system is continually evaluated in terms of an imminent collision with an obstacle, and autonomous emergency braking is initiated in the event of an unavoidable collision.

DE 36 37 165 A1 discloses a method for preventing collisions in road traffic in which situation parameters, vehicle parameters and environmental parameters are acquired by sensor systems, and are evaluated in terms of the presence of a hazardous situation. Alarm stages which are adapted to a determined degree of hazard are triggered and countermeasures are brought about. The sensor system comprises a surroundings sensor system on the basis of radar beams, infrared light or camera optics with image processing.

In the known method, the theoretical time period up to the impact, the braking deceleration which is necessary at a particular time in order to prevent the impact, the possible braking deceleration taking into account the acquired vehicle parameters and environmental parameters and the beginning and the braking force of a braking operation which prevents the collision are determined from the relative determined speed at which a collision object is approached. As a function of this evaluation, a warning to the driver (alarm stage I) is brought about when the distance from the vehicle drops below a first safety value.

If the distance drops further below the safety value without sufficient reaction by the driver in the aforementioned method, automatic activation of the brake system with a previously calculated braking force (alarm stage II) is additionally brought about. If the distance between the vehicle and an object which appears suddenly in the surroundings of the vehicle, for example as a result of a vehicle suddenly cutting into the driver's own lane, drops below the safety value to a considerable extent, maximum activation of the brake system (emergency braking) is brought about (alarm stage III), which is accompanied by the activation of additional safety devices such as, for example, deployment of bumpers or pretensioning of the seatbelts.

A further approach to actuating safety devices is based on the evaluation of driving state data. A motor vehicle having a preventive-action protection system which operates in such a way is disclosed, for example, in DE 101 21 386 C1. In this context, the driving state data is monitored in terms of a state of emergency braking request by the driver, and the vehicle occupant protection system is actuated when emergency braking is requested. In addition, a state of oversteering and a state of understeering, which indicate critical lateral dynamics, are additionally determined by a data processing device. If the state of an emergency braking request and/or the state of oversteering and/or the state of understeering are detected by the data processing device, the reversible vehicle occupant protection system is actuated. The sensor system for acquiring the driving state data which is evaluated for this purpose can comprise a steering angle sensor, a pedal travel sensor, a brake pressure sensor, a wheel speed sensor, an acceleration sensor and a yaw rate sensor.

An object of the invention is to improve a vehicle safety system by providing that the emergency braking is maintained only until a predefined event occurs. As is, for example, stated, the predefined event can be the expiration of a time which is calculated in advance up to the collision or the impact which is actually determined by sensors.

The autonomous emergency braking which is chronologically close to the impact is a full braking process with approximately 1 g or up to the slip limit in a phase starting from which an impact is certainly unavoidable. This corresponds to a time period of approximately 600-500 ms before the predicted start of the impact. This phase is also referred to as PRE-CRASH phase.

The present invention provides an abort condition which causes autonomous emergency braking to be terminated again and the brakes to be opened or released. Without an abort condition, during every emergency braking process, braking would occur up to the stationary state, which is undesired in particular if the emergency braking has occurred owing to incorrect triggering, for example triggered by an empty cardboard box lying on the road.

In one embodiment of the present invention, the event which terminates the emergency braking is the expiration of the collision time which is calculated in advance from the data relating to the surroundings and which is determined, for example, by a time counter, in which case a slight time supplement can be included. The calculated collision time can also be continuously corrected during the emergency braking. In this way, in the event of a collision time of several 100 ms in the future, the brakes can be closed only for this time period and opened after it without the opening of the brakes being linked to other conditions. If a collision occurs, the brakes are opened right at the start of the impact. The process of releasing the brakes is not yet terminated at the end of the collision (approximately 100 ms) so that the emergency braking also still supports the dissipation of energy during the crash.

If no significant collision occurs, that is to say if it is the case of incorrect triggering, the braking process can only be perceived as a braking impulse as a result of the chronological limitation provided that the emergency braking process was not preceded by relatively long partial braking. The chronological limitation of the braking process to the value which is predicted by the surroundings sensor system for the collision time therefore has the advantage that the safety system becomes tolerant to incorrect triggerings if the braking impulse remains chronologically limited in all cases. Since the timing counter is easy to implement, this solution is also very cost effective and robust.

If, in another embodiment of the present invention, after initiation of an emergency braking process the collision does not occur within a time window of approximately 50 ms after a collision time which is calculated in advance from the data relating to the surroundings, the braking process is aborted. If a collision does not occur, the emergency braking process is thus limited chronologically to several 100 ms. If there is no collision which is associated with a critical deceleration, for example in the event of an impact against an empty cardboard box, a vehicle occupant perceives the brief braking impulse as a temporary jolt provided that the emergency braking process has not been preceded by a relatively long phase of autonomous partial braking. The emergency braking, if appropriate with a preceding pretensioning of the brake system, is therefore an effective protective measure which can be used very quickly in a preventative fashion, even in traffic situations in which it is not possible to observe the collision object in advance or carry out autonomously initiated partial braking with just, for example, 0.4 g, which also serves to warn the driver.

The collision as such can be detected by a deceleration signal which is acquired from the signal of the acceleration sensor of the airbag control unit. Alternatively or additionally, a contact sensor system, exported acceleration sensors or deformation sensors can be used to detect an impact.

If in one particular embodiment of the invention the collision occurs, the braking process is maintained until the end of the collision is inferred from the acceleration signals of an acceleration sensor. The braking effect thus continues to be maintained during the entire course of the crash.

In another embodiment, the braking process is maintained for a predefined time period after the collision. This makes the aborting of the braking process independent of the evaluation of an acceleration sensor, making this method more robust with respect to external disruption.

In one development, emergency braking is suppressed if a driving situation which is critical in terms of vehicle movement dynamics, in particular in terms of the lateral dynamics of the vehicle, is present. The sensing of situations which are critical in terms of lateral dynamics, such as understeering and oversteering, is described, for example, in DE 101 21 386 C1.

It is also possible, however, to include an estimation of the lateral dynamics solely on the basis of observation of the activation of the steering wheel. Emergency braking could thus be suppressed if at the same time a severe or rapid steering wheel lock were to be detected, since simultaneous emergency braking could lead to the vehicle abruptly changing course.

In another development, emergency braking is suppressed if a limiting speed of, for example, 100-120 km/h is exceeded. In this way it is possible to take into account the fact that when a vehicle travels at a high speed, the driver's attention is generally significantly increased and the possibility of an autonomous emergency braking intervention does not have to be made available. On the other hand, the resolution of a currently adjacent radar system reaches its limits at these speeds.

In one further development there is provision that reversible restraining apparatuses such as, for example, an electric seatbelt pretensioner, deployable upholstered seat elements, for example knee upholstered elements or other reversible protection measures such as seat adjustment apparatuses, headrest activation apparatus or devices for closing window openings, are initiated with the emergency braking process. Furthermore, protection apparatuses which also serve to protect other parties to a collision, such as pedestrians or cyclists, can be activated, these being, for example, an active engine bonnet, deployable bumpers and impact elements on the outer skin of the vehicle whose hardness can be adjusted. Interventions in the ride level control system can also be provided.

The surroundings sensor system can operate with any type of sensors which sense surroundings. In this context, it is possible to use sensors on an electromagnetic basis which operate with radar waves, millimeter waves and micrometer waves, on an optical basis, such as Lidar systems or infrared systems and on an image-producing basis, for example mono, or stereo video. Of course, it is also possible to apply a combination of such sensors and the information acquired therefrom to improve the information quality. The surroundings sensor system must supply the physical variables of the distance and/or speed between the motor vehicle and the collision object, with the possibility of one of the variables being calculated by mathematical differentiation or integration in each case. In order to trigger the prevention-action safety measures as far as possible only in the range of unavoidable collisions, the sensor system must as far as possible supply precise information about the position of the collision object which, with information about the driver's own lane, permits differentiation between the vehicle traveling past closely, an avoidance maneuver and an imminent collision, with the degree of overlap being determined.

Other objects, advantages and novel features of the present invention will become apparent from the following detailed description of the invention when considered in conjunction with the accompanying drawings.

DETAILED DESCRIPTION OF THE DRAWINGS

Figure 1:
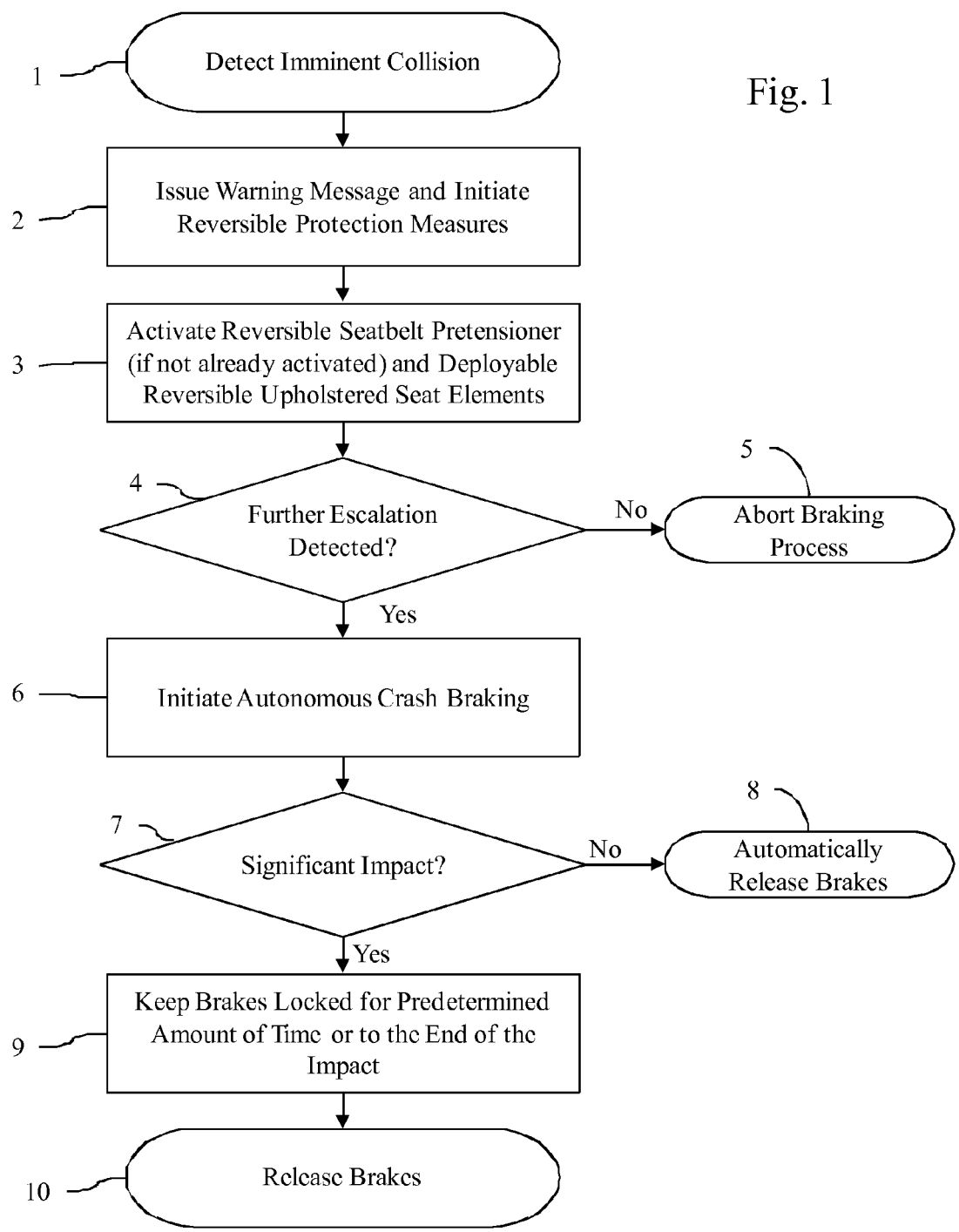
FIG. 1 is a flowchart of a first embodiment of the present invention.

In FIG. 1, the method is started in step 1 if an imminent collision is detected by the surroundings sensor system.

Step 2: If the collision time is still in the range of seconds in the future, a warning message can firstly be issued, for example visually, audibly or haptically, and is adjoined by an autonomously initiated partial braking process if a collision is still imminent. At the same time, reversible protection measures can be initiated, for example the seatbelt pretensioner should be also activated with a braking process. The brake system is already preconditioned, that is to say the brake system is prepared for the following full braking process, by eliminating the idle travel distances in the brake system, with the driver's warning or the partial braking, but at the latest 750-650 ms before the start of the impact. A small braking pressure is already built up in order to be able to initiate the braking process more quickly in the course of further escalation.

Step 3: Approximately 650-600 ms before the anticipated impact, this corresponds to an approach to approximately 10 m at a vehicle speed of 64 km/h, the reversible seatbelt pretensioner is activated if it has not already been activated with a preceding partial braking process, so that the seatbelt slack is removed from the seatbelt system of the vehicle occupants if the emergency braking process takes place. In addition, deployable reversible upholstered seat elements can be activated. The surrounding sensor system continues to observe whether the situation escalates.

Alternatively, the seatbelt pretensioners can also be initiated later, specifically at the same time as the autonomous crash braking process in step 6.

Step 4: If no further escalation of the situation can be detected by the surroundings sensor system, the braking process is aborted in Step 5.

If a further escalation of the hazardous situation can be detected, autonomous crash braking (emergency braking) is initiated in step 6 600-500 ms before the anticipated impact, which is unavoidable at this time. A further condition is that all the vehicle occupants are protected by the seatbelt. The seatbelt lock state is interrogated for the driver and additionally the seatbelt engaged state is also interrogated for the front seat passenger places. A further condition is that a state which is not problematic in terms of vehicle movement dynamics is present, in order to avoid triggering of the emergency braking process when cornering or at a very high driving speed. In particular, the emergency braking process is suppressed in the case of critical lateral dynamics of the vehicle, for example in the case of high lateral acceleration forces, understeering, oversteering or the ESP responding.

The anticipated impact time (time to collision or TTC) is determined from the measured approach speed and the distance from the obstacle. A simple calculation for the impact time is obtained if that time is calculated from the quotient of a relative distance and a relative speed between the collision object and the driver's own vehicle. However, more complex algorithms, which include, for example, mass inertia, braking effect and coefficient friction, can also be used.

Step 7: If a significant impact does not follow this emergency braking process at the latest 600 ms after the start of the emergency braking process or approximately 50 ms after the predicted start of the impact, it is clearly a case of incorrect triggering. In this case, in step 8 the brakes are automatically released again. The impact can be sensed by existing systems such as a contact sensor system on the bumper at the front, which can simultaneously serve as a pedestrian impact sensor, or by the acceleration signal of the airbag sensor.

If the triggering was undesired or not necessary, the full braking process is therefore terminated after 650 ms at the latest. If no partial braking process preceded it, the situation is perceived by the driver as a jolt, but it does not adversely affect the driving safety.

If the autonomous emergency braking process is followed by an impact in the anticipated time window, the brakes remain locked in step 9 for a predetermined time period or to the end of the impact. The end of the impact can be detected from the decay of the acceleration impulse, which is measured in the airbag control unit with the central acceleration sensor.

In step 10 the method is terminated, with the brakes being released again or being set to a braking effect which is reduced compared to the emergency braking if an impact has been detected with a relatively large severity in terms of an accident. The latter would have the advantage that the vehicle involved in an accident would continue to be braked.

Figure 2:
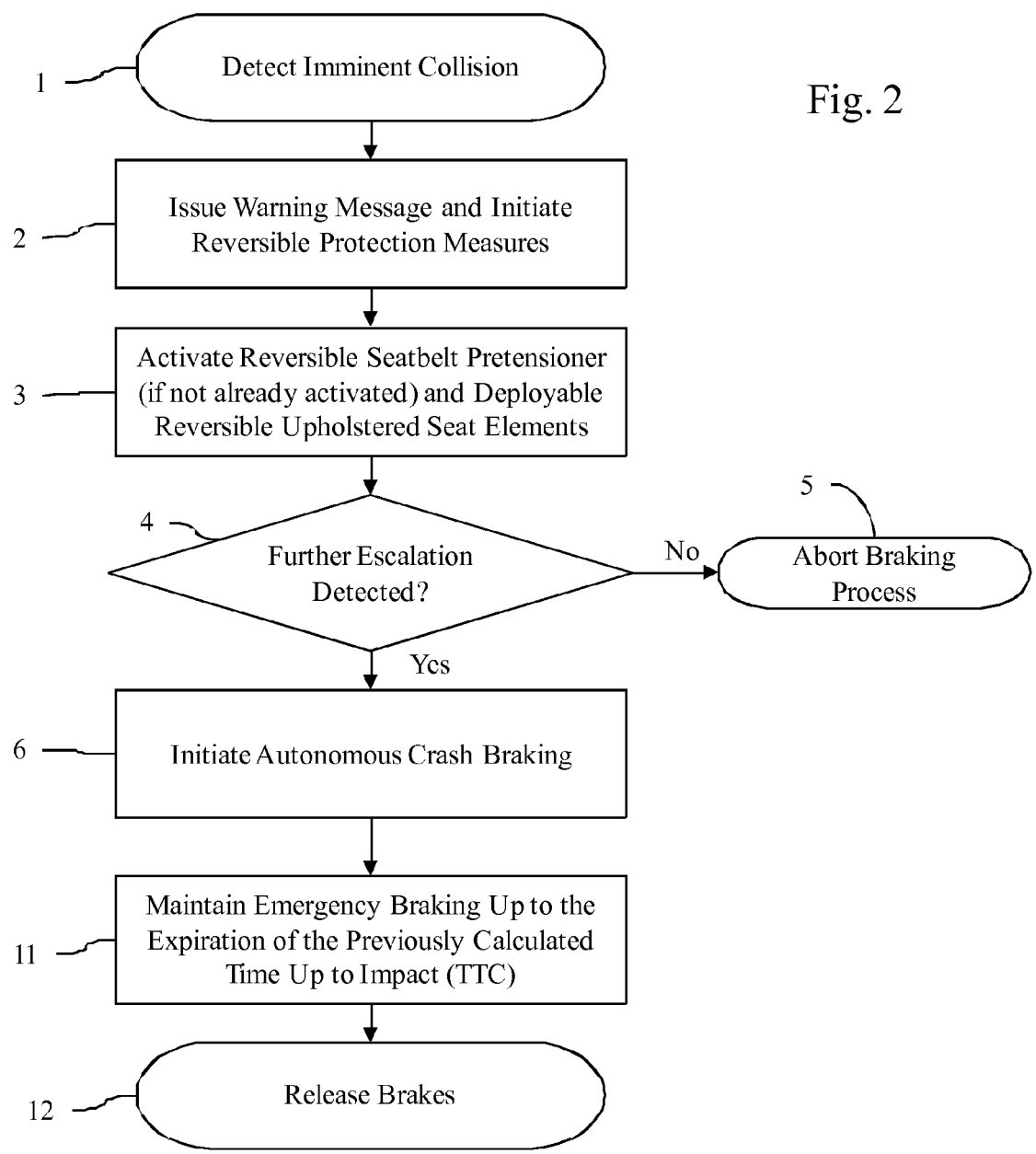
FIG. 2 is a flowchart of a second embodiment of the present invention.

The method in FIG. 2 follows the same steps 1 to 6 as the previously described method in FIG. 1. For this reason, the same numerical symbols have been selected for these steps.

The activation of the emergency braking process in step 6 is followed in step 11 by the emergency braking being maintained up to the expiration of the previously calculated time up to the impact (TTC), that is to say until the theoretical impact time (collision time) is reached.

After the expiration of the time, the method is ended in step 12, with the brake being released again.

The above-described incremental escalation of the activities which are chronologically close to the impact provides the following advantages.

Owing to the additional dissipation of energy before and in the event of an impact, the severity in terms of an accident and the resulting loading on the vehicle occupants is reduced. In the case of an accident with an oncoming vehicle, the other party to the accident also benefits. Owing to the emergency braking before the impact, any slack in a seatbelt is eliminated and the vehicle occupant participates in the deceleration of the vehicle from the start of the impact, which brings about an additional reduction in the loading on the vehicle occupants.

The invention claimed is:

1. A method for a safety system in a vehicle, comprising continuously evaluating data relating to the surroundings from a surroundings sensor system in terms of an imminent collision with an obstacle, initiating autonomous emergency braking in the event of an unavoidable collision, and maintaining the emergency braking until a predefined event occurs, wherein the emergency braking is maintained up to a collision time that is calculated in advance from the surroundings data, whereupon a brake is then opened.

2. The method as claimed in claim 1, wherein the emergency braking is aborted if the collision does not occur within a predetermined time window after the collision time that is calculated in advance from the data relating to the surroundings.

3. The method as claimed in claim 2, wherein the predetermined time window is about 50 ms.

4. The method as claimed in claim 2, wherein upon occurrence of the collision, the emergency braking is maintained until the end of the collision is inferred from acceleration sensor signals.

5. The method as claimed in claim 4, wherein, after the termination of the emergency braking, a braking effect which is reduced compared to the emergency braking is continued if an impact with a high degree of severity in terms of an accident has been detected.

6. The method as claimed in claim 2, wherein upon occurrence of the collision, the emergency braking is maintained for a predefined time period after the collision.

7. The method as claimed in claim 6, wherein, after the termination of the emergency braking, a braking effect which is reduced compared to the emergency braking is continued if an impact with a high degree of severity in terms of an accident has been detected.

8. The method as claimed in claim 2, wherein the occurrence of the collision is detected by at least one of a contact sensor system, exported acceleration sensors or deformation sensors and an airbag control unit acceleration sensor.

9. The method as claimed in claim 8, wherein upon occurrence of the collision, the emergency braking is maintained until the end of the collision is inferred from acceleration sensor signals.

10. The method as claimed in claim 8, wherein upon occurrence of the collision, the emergency braking is maintained for a predefined time period after the collision.

11. The method as claimed in claim 10, wherein emergency braking is suppressed or is carried out only with a reduced braking effect if at least one of a driving situation which is critical in terms of vehicle movement dynamics.

12. The method as claimed in claim 11, wherein the critical driving situation is critical in terms of lateral dynamics.

13. The method as claimed in claim 1, wherein the emergency braking is suppressed or is carried out only with a reduced braking effect if not all vehicle occupants are deemed secured by a seatbelt.

14. The method as claimed in claim 1, wherein at the same time as the emergency braking occurs, reversible protection measures are activated.

15. The method as claim in claim 14, wherein one of the measures is a reversible seat belt pretensioner.

* * * * *